G. A. ALLEN.
Check-Hook for Harness.

No. 206,518. Patented July 30, 1878.

Attest:
J. A. McKnight
C. S. Ford

Inventor:
George A. Allen.
Per. Atty.
J. E. Thomas.

UNITED STATES PATENT OFFICE.

GEORGE A. ALLEN, OF WEST BAY CITY, MICHIGAN.

IMPROVEMENT IN CHECK-HOOKS FOR HARNESSES.

Specification forming part of Letters Patent No. 206,518, dated July 30, 1878; application filed October 1, 1877.

*To all whom it may concern:*

Be it known that I, GEORGE A. ALLEN, of West Bay City, county of Bay, and State of Michigan, have invented a new and useful Improvement in Pad-Hooks, which improvement is fully set forth in the following specification and the accompanying drawings, in which—

Figure 1:
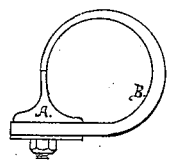
Figure 2:
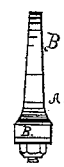
Figure 3:
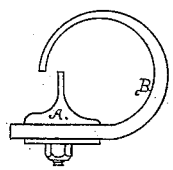
Figure 4:
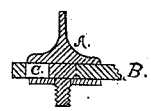
Figure 5:

Figure 1 is a side view, showing the hook closed. Fig. 2 is a rear end view. Fig. 3 is a side view, showing the hook open; and Figs. 4 and 5 are sections, showing slot C.

Many horses have acquired the habit of disengaging the check-rein from the pad-hook by a dexterous jerk of the head when being driven, and thereby causing great annoyance to the driver; and the object of my invention is to furnish a device by means of which the check-rein on the horse will be secured in the pad-hook, so that it cannot be thrown out by the movement of the horse while being driven.

In the drawings, A is a post passing through the hook B, and secured to the pad by a nut or other suitable means, and furnished with a peculiar-shaped head, which forms a part of the hook when closed, as shown by Fig. 1.

The hook B is provided with the slot C, as shown in sections 4 and 5, through which the post A passes, and which allows the hook to move forward or backward for the closing or opening of the hook.

The hook being open, as shown in Fig. 3, the rein is slipped in, and as it is drawn upon by the horse's head moves the hook forward, and in the position shown by Fig. 1. The rein is disengaged by sliding the hook backward and making the opening, as shown in Fig. 3, through which the rein is easily passed.

The operation of my device is not confined to the pad-hook alone; but it is equally applicable to the terrets for holding the driving-reins, upon which it operates, as before described.

I am aware that the post and hook are not new and are in use; but

What I claim as my invention is—

In combination with the curved hook B, having a slot, C, in its base, the sliding post A, having a screw-shank passing through the slot and held by a nut, the post being of such height as to join with the point of the hook B, and close the opening when the check-rein is drawn forward, as herein set forth.

GEORGE A. ALLEN.

Witnesses:
J. W. HAUXHURST,
DAVID WILCOX.